United States Patent Office
3,632,592
Patented Jan. 4, 1972

3,632,592
CERTAIN SUBSTITUTED THIENO[2,3-c]4,5,6,7-
TETRAHYDRO PYRIDINES
Michio Nakanishi, Oita, and Toshihiro Kobayakawa and Tetsuya Tahara, Fukuoka, Japan, assignors to Yoshitomi Pharmaceutical Industries, Ltd., Higashi-ku, Osaka, Japan
No Drawing. Filed Jan. 30, 1970, Ser. No. 8,098
Claims priority, application Japan, Feb. 3, 1969, 44/7,973; May 22, 1969, 44/40,033; June 11, 1969, 44/45,923
Int. Cl. C07d 31/50
U.S. Cl. 260—294.8 C    5 Claims

ABSTRACT OF THE DISCLOSURE

Thienopyridine derivatives of the formula

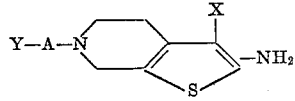

wherein X is cyano, carbamoyl or alkoxycarbonyl (wherein the alkoxy group has 1–4 carbon atoms), Y is cyano or carbamoyl, and A is —$CH_2$—CH(OH)—$CH_2$— or alkylene of 1–4 carbon atoms, and pharmaceutically acceptable acid addition salts thereof. The above compounds are useful as blood sugar lowering agents.

---

This invention relates to novel and therapeutically valuable thienopyridine derivatives.

The thienopyridine derivatives of the present invention have the formula:

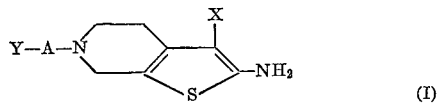

wherein X is cyano, carbamoyl or alkoxycarbonyl (wherein the alkoxy group has 1–4 carbon atoms, such as methoxycarbonyl, ethoxycarbonyl, propoxycarbonyl, ispropoxycarbonyl, butoxycarbonyl, secondary butoxycarbonyl or tertiary butoxycarbonyl), Y is cyano or carbamoyl, and A is —$CH_2$—CH(OH)—$CH_2$— or alkylene of 1–4 carbon atoms (such as —$CH_2$—,

—$CH_2$—$CH_2$—, —$CH_2$—$CH_2$—$CH_2$— or —$CH_2$—CH($CH_3$)—$CH_2$—).

Compounds in accordance with Formula I may be produced by any of the following methods, wherein X and Y as set forth in the following formulas are as set forth with regard to Formula I:

(A1) By the reaction of a compound of the formula:

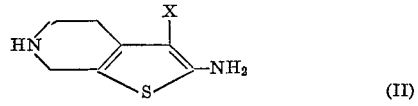

with a compound of the formula:

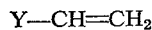

Y—CH=$CH_2$

This reaction is advantageously carried out in an inert solvent (e.g., water, methanol, ethanol, toluene, dimethylformamide, dimethyl sulfoxide and the like) at room temperature, optionally in the presence of a catalyst, such as sodium methoxide, sodium hydroxide or Triton B (benzyltrimethylammonium hydroxide).

The starting materials in accordance with Formula II can be produced, for example, by reacting 4-piperidone or an acid addition salt thereof (e.g., hydrochloride, hydrobromide) with a compound of the formula:

X—$CH_2$—CN and sulfur in the presence of an organic base, optimally a secondary amine such as piperidine or morpholine.

(A2) By the reaction of a compound of Formula II with a compound of the formula:

NC—A—$X^1$ wherein $X^1$ is halogen or organic sulfonyloxy (e.g., methylsulfonyloxy, p-tolylsulfonyloxy or the like).

This reaction is carried out in an inert solvent (e.g., methanol, ethanol, toluene, dimethylformamide, dimethyl sulfoxide, aqueous ethanol) at room temperature or at an elevated temperature up to refluxing temperature, optimally in the presence of a deacidifying agent such as sodium carbonate, potassium carbonate, triethylamine or pyridine.

(A3) By the reaction of a compound of Formula II with an epoxide of the formula:

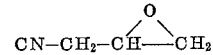

to produce compounds of Formula I wherein A is

—$CH_2$—CH(OH)—$CH_2$— and Y is cyano.

This reaction is carried out in an inert solvent (e.g., methanol, ethanol, aqueous ethanol, toluene, dimethylformamide, dimethyl sulfoxide) at room temperature or at an elevated temperature of 50 to 150° C.

(B) By the reaction of a compound of the formula:

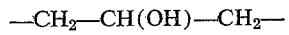

($X^1$ being as above defined) with an alkali cyanide such as sodium cyanide or potassium cyanide.

This reaction is carried out in an inert solvent (e.g., ethanol, methanol, toluene, dimethylformamide, dimethyl sulfoxide) at room temperature or at an elevated temperature up to refluxing temperature, usually for 2 to 15 hours, with the addition of a small amount of water to said solvent.

(C1) By the reaction of a compound of the formula:

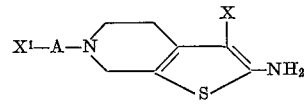

with a compound of the formula:

X—$CH_2$—CN    (IV)

and sulfur, preferably in the presence of an amine (e.g., cyclohexylamine, diethylamine, morpholine, piperidine, triethylamine or the like), preferably a secondary amine.

(C2) An alternative to method (C1) comprises reacting a compound of Formula III with a compound of Formula IV and then reacting the compound thus obtained of the formula:

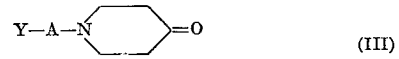

with sulfur, preferably in the presence of an amine such as those employed in (C1), again, preferably with a secondary amine.

(C3) An additional alternative to method (C2) comprises reacting a compound of the Formula III with a secondary amine (e.g., diethylamine, morpholine, piperidine and the like) and then reacting the resulting enamine of the formula:

wherein Y is a secondary amine residue, such as diethylamino, morpholino or piperidino, with a compound of Formula IV and sulfur.

The reactions involved in Methods C1, C2 and C3 are carried out without solvent or in an inert solvent (e.g., methanol, ethanol, benzene, dimethylformamide, tetrahydrofuran or the like) at room temperature or at an elevated temperature of up to about 150° C.

The thienopyridine derivatives of Formula I produced according to the above-mentioned methods (A1 to C3) can be recovered in a known manner, for example by cooling the reaction mixture or formation of an insoluble salt and collecting the precipitate by filtration, and can be purified by recrystallization. They can form acid addition salts with various inorganic or organic acids such as hydorchloric, hydrobromic, sulfuric, nitric, phosphoric, acetic, oxalic, maleic, fumaric, citric, tartaric, malonic and ascorbic acids.

Thienopyridine derivatives of Formula I as well as their pharmaceutically acceptable acid addition salts have excellent blood sugar lowering action and are useful as drugs for the treatment of diabetes and prediabetes. For example, the compounds of Formula I listed below have the following pharmacological properties:

(1) BLOOD SUGAR LOWERING ACTION IN GLUCOSE FED MICE

The test compounds were administered orally to dd-strain mice (female, 19–24 g.) abstained from food overnight. One hour later 4 g. per kg. of body weight of glucose was administered orally to the mice and, after one more hour, the blood sugar value was measured. The dose $ED_{20}$ was determined by which the blood sugar level was lowered by 20% against the control glucose fed mice. The results are shown in Table I.

TABLE I

| Compound [1] | $ED_{20}$ (mg./kg. body weight) |
|---|---|
| A | 30 |
| B | 100 |
| C | 45 |
| D | 50 |
| E | >160 |

[1] In the above Table I, compounds A–E are as follows:

A: 2-amino-3-ethoxycarbonyl-6-(2-cyanoethyl)-4,5,6,7-tetrahydrothieno[2,3-c]pyridine hydrochloride
B: 2-amino-3-ethoxycarbonyl-6-(2-carbamoylethyl)-4,5,6,7-tetrahydrothieno[2,3-c]pyridine hydrochloride
C: 2-amino-3-ethoxycarbonyl-6-(2-cyanopropyl-4,5,6,7-tetrahydrothieno[2,3-c]pyridine maleate
D: 2-amino-3-ethoxycarbonyl-6-(3-cyano-2-hydroxypropyl)-4,5,6,7-tetrahydrothieno[2,3-c]pyridine
E (prior art compound)[2]: 2-amino-6-benzyl-3-ethoxycarbonyl-4,5,6,7-tetrahydrothieno[2,3-c]pyridine hydrochloride.

[2] Which is useful as an analgesic or anti-inflammatory agent. See, for example, Published German patent application OLS 1,812,404.

(2) BLOOD SUGAR LOWERING ACTION IN DIABETIC MICE INDUCED BY ALLOXAN AND IN NORMAL RATS (a) The effect on alloxan diabetic mice was observed according to the method of A. Lazarow described in Proceedings of the Society for Experimental Biology and Medicine, volume 66, p. 4 (1947).

(b) The effect on normal rats was observed by the following method:

The test compounds were administered orally to Wistar strain female rats abstained from food for 16 hours. The blood sugar value was measured two hours later to prepare the dose response curve and determine the $ED_{20}$ value (the dose required to lower the blood sugar level by 20%). The results are shown in Table II.

TABLE II

| Compound | $ED_{20}$ (mg./kg. body weight) | |
| | Alloxan mouse | Normal rat |
|---|---|---|
| A[1] | 50 | >160 |
| Tolbutamide | >160 | 30 |

[1] Compound designation is the same as in Table I.

As shown in Table II, in contrast to sulfonylureas such as tolbutamide, the compounds of the invention are effective against alloxan diabetic mice, but inactive against normal rats This means that the danger of causing hypoglycemia (excessively diminished content of glucose in the blood) can be avoided in the treatment of diabetes and prediabetes, which the compounds of the invention are used.

(3) TOXICITY

The oral $LD_{50}$ values of 2-amino-6-(2-cyanoethyl)-3-ethoxycarbonyl-4,5,6,7-tetrahydrothieno[2,3-c]pyridine hydrochloride in mice and rats are 360 and 1500 mg./kg. bory weight, respectively.

The compounds in accordance with Formula I and pharmaceutically acceptable acid addition salts thereof can be administered safely per se or in the form of a pharmaceutical composition in admixture with a suitable carrier or adjuvant, administrable orally, without causing harm to the host.

The pharmaceutical composition can take the form of tablets, granules, powders, etc. The following are examples of tablet compositions to be taken when a compound of the invention is administered for a pharmaceutical purpose, each tablet containing 2-amino-6-(2-cyanoethyl)-3-ethoxycarbonyl-4,5,6,7-tetrahydrothieno[2,3-c]pyridine hydrochloride (Compound A) in an amount corresponding to 25 mg. or 50 mg. of its free base.

| | 25 mg. tablet, mg. | 50 mg. tablet, mg. |
|---|---|---|
| Compound A | 28.2632 | 56.5264 |
| Lactose | 3.0368 | 58.0736 |
| Microcrystalline cellulose | 7.0000 | 10.0000 |
| Corn starch | 10.0000 | 13.0000 |
| Methyl cellulose | 1.2500 | 1.6500 |
| Magnesium stearate | 0.7000 | 1.0000 |
| Total | 110.25 | 140.25 |

These tablets are preferably film coated, for example with a coating composition comprising 40 g. of hydroxypropyl-cellulose, 20 g. of ethylcellulose, 10 g. of polyethyleneglycol 6000, 50 g. of titanium oxide, 20 g. of highly dispersed silicon dioxide (Aerosil), 700 ml. of acetone and 300 ml. of isopropanol.

The usual daily dose of, for example the compound in accordance with Formula I or a pharmaceutically acceptable salt thereof, calculated as free base, is in the range of about 100 to about 500 milligrams, more particularly, about 150 to 300 milligrams per human adult. Thus, in case of the 25 mg. tablets exemplified above, it would be suitable to administer 2 to 4 tablets three times a day.

The following examples will further illustrate the present invention.

Example 1

A solution of 22.4 g. of 2-amino-3-ethoxycarbonyl-4,5,6,7-tetrahydrothieno[2,3-c]pyridine and 5.5 g. of acrylonitrile in 100 ml. of ethanol is stirred at room temperature. After about 20 minutes, crystals begin to separate out. After 2 hours, the solution is cooled on an ice bath to complete crystallization. The crystals are collected by suction filtration and recrystallized from ethanol to give 2-amino-3-ethoxycarbonyl-6-(2-cyanoethyl)-4,5,6,7-tetrahydrothieno[2,3-c]pyridine, which melts at 98–99° C., as colorless prisms. Yield: 26.7 g. (95.6%).

Its hydrochloride melts at 219° C. with decomposition.

Example 2

A solution of 11.3 g. of 2-amino-3-ethoxycarbonyl-4,5,6,7-tetrahydrothieno[2,3-c]pyridine and 3.6 g. of acrylamide in 150 ml. of ethanol is stirred for 5 hours at room temperature. The solution is cooled, and the crystals precipitated are collected by filtration and recrystallized from ethanol to give 2-amino-3-ethoxycarbonyl-6-(2- carbamoylethyl)-4,5,6,7-tetrahydrothieno[2,3 - c]pyridine, which melts at 156–158° C., as colorless granules. Yield: 12.8 g. (86.5%).

Its hydrochloride melts at 219–220° C. with decomposition.

Example 3

A mixture of 11.3 g. of 2-amino-3-ethoxycarbonyl-4,5,6,7-tetrahydrothieno[2,3-c]pyridine, 4.5 g. of 3-chloropropionitrile, 7.0 g. of potassium carbonate and 100 ml. of ethanol is heated under reflux for 4 hours. After allowing the reaction mixture to stand and cool to room temperature, an inorganic substance is separated by suction filtration, and the filtrate is concentrated to half its original volume and then cooled on an ice bath. The crystals produced are collected by filtration, washed with cold ethanol and recrystallized from ethanol to give 2-amino-3-ethoxy-carbonyl - 6 - (2-cyanoethyl-4,5,6,7-tetrahydrothieno[2,3-c]pyridine, which melts at 98–99° C., as colorless prisms. Yield: 13.3 g. (89%).

Its hydrochloride melts at 219° C. with decomposition.

Example 4

A mixture of 11.3 g. of 2-amino-3-ethoxycarbonyl-4,5,6,7-tetrahydrothieno[2,3-c]pyridine, 12.0 g. of 3-p-tolysulfonyloxybutyronitrile and 7.0 g. of potassium carbonate in 200 ml. of ethanol is heated under reflux for 6 hours. After cooling the mixture, an insoluble substance is separated by filtration. The filtrate is concentrated under reduced pressure and the residue is dissolved in 100 ml. of ethyl acetate. The solution is washed well with water, dried over anhydrous potassium carbonate and concentrated under reduced pressure. The residue is dissolved in 100 ml. of warm ethanol, and a solution of 5.8 g. of maleic acid in 20 ml. of ethanol is added to the solution. The mixture is allowed to stand overnight under refrigeration. The crystals produced are collected by filtration and recrystallized from aqueous ethanol to give 2-amino-3-ethoxycarbonyl-6-(3-cyanopropyl) - 4,5,6,7 - tetrahydrothieno[2,3-c]pyridine maleate, which melts at 179–181° C. with decomposition. Yield: 13.8 g. (68.5%).

Example 5

A solution of 3.3 g. of potassium cyanide in 10 ml. of water is added to a solution of 16.0 g. of 2-amino-3-ethoxycarbonyl-6-(2-hydroxy-3-chloropropyl) - 4,5,6,7 - tetrahydrothieno[2,3-c]pyridine in 70 ml. of dimethylformamide. The mixed solution is heated at 70–80° C. for 7 hours. The reaction mixture is at first a homogeneous yellowish solution, but after about 2 hours potassium chloride begins to crystallize out. After the conclusion of the heating, the potassium chloride is separated by filtration, and the filtrate is poured into 500 ml. of ice water. An oily substance separates and soon crystallizes. The crystals are collected by filtration, washed with water and then with cold ethanol, and then recrystallized from ethanol to give 2-amino-3-ethoxycarbonyl-6-(2-hydroxy - 3 - cyanopropyl)-4,5,6,7-tetrahydrothieno[2,3-c]pyridine, which melts at 132–134° C., as colorless plates. Yield: 9.9 g. (64%).

Example 6

A solution of 11.3 g. of 2-amino-3-ethoxycarbonyl-4,5,6,7-tetrahydrothieno[2,3-c]pyridine and 4.3 g. of γ-cyanopropylene oxide (3.4-epoxybutyronitrile) in 200 ml. of 90% ethanol is stirred at 40° C. for 5 hours. Then the solvent is removed by reduced pressure distillation. Aqueous ethanol is added to the residue, to crystallize out the product. The crystals are collected by filtration and recrystallized from ethanol to give 2-amino-3-ethoxycarbonyl-6-(3-cyano-2-hydroxypropyl) - 4,5,6,7 - tetrahydrothieno[2,3-c]pyridine, which melts at 132–134° C. Yield: 12.05 g. (78%).

Example 7

A mixture of 15.2 g. of 1-(2-cyanoethyl)-4-piperidone, 11.3 g. of ethyl cyano acetate, 2 ml. of triethylamine, 3.2 g. of powdery sulfur and 100 ml. of ethanol is heated under reflux for 2 hours. The reaction mixture is ice cooled, and the crystals produced are collected by filtration, washed with a small amount of cold ethanol and recrystallized from ethanol to give 2-amino-3-ethoxycarbonyl-6-(2-cyanoethyl)-4,5,6,7-tetrahydrothieno[2,3-c]pyridine, which melts at 98–99° C., as colorless prisms. Yield: 20.4 g. (73%).

Its hydrochloride melts at 219° C. with decomposition.

Examples 8–13

In the same manner as in the above examples, substituting appropirate starting materials, the following thienopyridine derivatives are also produced:

(8) 2-amino-3-ethoxycarbonyl - 6 - (2-ethoxycarbonylethyl) - 4,5,6,7 - tetrahydrothieno[2,3-c]pyridine hydrochloride, which melts at 176–181° C. with decomposition, colorless flakes.

(9) 2-amino-3-carbamoyl - 6 - (2-cyanoethyl)-4,5,6,7-tetrahydrothieno[2,3-c]pyridine, which melts at 194–196° C., light yellow prisms.

Its hydrochloride, colorles flakes, melts at 204° C. with decomposition.

(10) 2-amino-3-butoxycarbonyl - 6 - (2-cyanoethyl)-4,5,6,7-tetrahydrothieno[2,3-c]pyridine, which melts at 78° C., colorless flakes.

(11) 2-amino-3-cyano-6-(2 - cyanoethyl)-4,5,6,7-tetrahydrothieno[2,3-c]pyridine melting at 134–136° C.

(12) 2-amino-3-ethoxycarbonyl-6-cyanomethyl-4,5,6,7-tetrahydrothieno[2,3-c]pyridine hydrochloride melting at 201–204° C. with decomposition.

(13) 2 - amino-3-ethoxycarbonyl-6-(3-cyano-2-methylpropyl)-4,5,6,7-tetrahydrothieno[2,3-c]pyridine melting at 110–113° C.

What is claimed is:
1. A thienopyridine of the formula

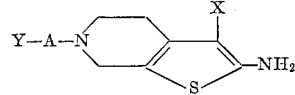

and pharmaceutically acceptable acid addition salts thereof wherein X is selected from the group consisting of cyano, carbamoyl and alkoxycarbonyl wherein the alkoxy group has from 1 to 4 carbon atoms, Y is selected from the group consisting of cyano and carbamoyl, and A is selected from the group consisting of $$-CH_2-CH(OH)-CH_2-$$

and alkylene of 1 to 4 carbon atoms.

2. A compound according to claim 1 having the name 2-amino-3-ethoxycarbonyl - 6 - (2-cyanoethyl)-4,5,6,7-tetrahydrothieno[2,3-c]pyridine.

3. A compound according to claim 1 having the name 2 - amino-3-ethoxycarbonyl-6-(2-carbamoylethyl)-4,5,6,7-tetrahydrothieno[2,3-c]pyridine.

4. A compound according to claim 1 having the name 2-amino-3-ethoxycarbonyl - 6 - (3-cyanopropyl)-4,5,6,7-tetrahydrothieno[2,3-c]pyridine.

5. A compound according to claim 1 having the name 2 - amino-3-ethoxycarbonyl-6-(2-hydroxy-3-cyanopropyl)-4,5,6,7-tetrahydrothieno[2,3-c]pyridine.

References Cited

UNITED STATES PATENTS 3,563,997    2/1971    Nakanishi et al. __ 260—294.8 C

ALAN L. ROTMAN, Primary Examiner

U.S. Cl. X.R.

260—293.4-G, 294-A, 294.3-R, 294.8-F, 294.9, 295-AM; 424—266